US010502892B2

(12) United States Patent
Ma et al.

(10) Patent No.: US 10,502,892 B2
(45) Date of Patent: Dec. 10, 2019

(54) BACKLIGHT MODULE AND DISPLAY DEVICE

(71) Applicant: BOE TECHNOLOGY GROUP CO., LTD., Beijing (CN)

(72) Inventors: Yongda Ma, Beijing (CN); Xinyin Wu, Beijing (CN); Yong Qiao, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 0 days.

(21) Appl. No.: 15/766,144

(22) PCT Filed: Aug. 4, 2017

(86) PCT No.: PCT/CN2017/096038
§ 371 (c)(1),
(2) Date: Apr. 5, 2018

(87) PCT Pub. No.: WO2018/126675
PCT Pub. Date: Jul. 12, 2018

(65) Prior Publication Data
US 2019/0121015 A1 Apr. 25, 2019

(30) Foreign Application Priority Data
Jan. 5, 2017 (CN) .................... 2017 2 0013966 U

(51) Int. Cl.
*F21V 8/00* (2006.01)
(52) U.S. Cl.
CPC ......... *G02B 6/0088* (2013.01); *G02B 6/0016* (2013.01)

(58) Field of Classification Search
CPC ........................... G02B 6/0088; G02B 6/0016
See application file for complete search history.

(56) References Cited

U.S. PATENT DOCUMENTS

2007/0172193 A1* 7/2007 Chang ................. G02B 6/0088
385/147
2011/0069509 A1* 3/2011 Lin ...................... G02B 6/0088
362/607

(Continued)

FOREIGN PATENT DOCUMENTS

CN 201992469 U 9/2011
CN 202149421 U 2/2012

(Continued)

OTHER PUBLICATIONS

Machine English Translation of CN202149421U (Year: 2012).*
International Search Report dated Oct. 26, 2017.
First Korean Office Action dated Jun. 12, 2019.

*Primary Examiner* — Anh T Mai
*Assistant Examiner* — Glenn D Zimmerman
(74) *Attorney, Agent, or Firm* — Dilworth & Barrese, LLP.; Michael J. Musella, Esq.

(57) ABSTRACT

Disclosed are a backlight module and a display device. The backlight module includes a back plate; at least one positioning mechanism is disposed inside the bottom plate of the back plate, each positioning mechanism includes at least one positioning stud, each positioning stud includes a main body and a flexible sleeve wrapping the main body. The backlight module further includes a light guide plate; a groove matched with at least one positioning mechanism is provided on the light guide plate, an inner wall of the groove is in contact with the flexible sleeve of the main body.

16 Claims, 3 Drawing Sheets

(56) References Cited

U.S. PATENT DOCUMENTS

2013/0135559 A1    5/2013   Deng et al.
2018/0173031 A1    6/2018   Yu et al.

FOREIGN PATENT DOCUMENTS

| CN | 102494273 | A | | 6/2012 |
|---|---|---|---|---|
| CN | 202511121 | U | | 10/2012 |
| CN | 202757067 | U | | 2/2013 |
| CN | 203147502 | U | * | 8/2013 |
| CN | 105182605 | A | | 12/2015 |
| JP | 2011216274 | A | | 10/2011 |
| KR | 1019990033771 | A | | 5/1999 |

* cited by examiner

BACKLIGHT MODULE AND DISPLAY DEVICE

CROSS-REFERENCE OF THE RELATED APPLICATION

The present application claims the priority of Chinese patent application No. 201720013966.8 filed on Jan. 5, 2017, the disclosure of which is incorporated herein by reference in its entirety.

TECHNICAL FIELD

Embodiments of the present disclosure relate to a field of display technology, especially relate to a backlight module and a display device.

BACKGROUND

A backlight module is one of the key components of a liquid crystal display device; the basic principle of the backlight module is to convert a point light source or a line light source into a surface light source with high brightness and good uniformity, thereby enabling the liquid crystal display panel to display images normally.

During the transportation of the existing backlight module, since a light guide plate is in a hard contact with positioning parts disposed thereon, it is prone to generate scraps due to friction, and the display effect is affected when the scraps enter between the light guide plate and the optical film. In addition, the accumulated tolerance of a plurality of positioning parts disposed between the back plate and frame may lead to deviations of the light guide plate and the films, thereby affecting the image quality.

SUMMARY

Embodiments of the present disclosure provide a backlight module and a display device, in order to reduce the generation of the scraps and avoid the deviations of the light guide plate and the optical films.

An embodiment of the present disclosure provides a backlight module, comprising: a back plate, wherein at least one positioning mechanism is provided inside the bottom plate of the back plate, each positioning mechanism comprises at least one positioning stud, and each positioning stud comprises a main body and a flexible sleeve wrapping the main body; and a light guide plate, wherein the light guide plate is provided with a groove matched with the at least one positioning mechanism, and an inner wall of the groove is in contact with the flexible sleeve.

As an example, the backlight module further comprises: an optical film, wherein the optical film is provided with a notch matched with the at least one positioning mechanism.

As an example, the main body is in columnar shape, and the main body has same shape and same size at any cross-section in a plane parallel to the bottom plate of the backplane.

As an example, the main body is in stepped columnar shape, and comprises a first portion proximal to the light guide plate and a second portion proximal to the optical film; wherein an orthographic projection of the first portion is greater than an orthographic projection of the second portion in a plane parallel to the bottom plate of the back plate.

As an example, the main body is in tapered shape, and the main body is tapered in a direction from the light guide plate to the optical film.

As an example, the flexible sleeve is in stepped tube shape, and comprises a first portion proximal to the light guide plate and a second portion proximal to the optical film; a thickness of the first portion is greater than a thickness of the second portion in a direction perpendicular to the bottom plate.

As an example, a shape of a cross-section of the main body in a plane parallel to the bottom plate is in regular geometric shape.

As an example, the regular geometric shape is one of oval, circle and regular polygon.

As an example, each positioning mechanism further comprises a flexible gasket, the flexible gasket is connected with the bottom plate of the back plate, and the flexible sleeve of the at least one positioning stud and the flexible gasket are integral structure.

As an example, the bottom plate of the back plate comprises a protrusion, and the flexible gasket comprises a hole matched with the protrusion.

As an example, the bottom plate of the back plate comprises a groove, and the flexible gasket comprises a protrusion matched with the groove.

As an example, the flexible sleeve is a rubber sleeve, and the flexible gasket is a rubber gasket.

As an example, the at least one positioning mechanism comprises a plurality of positioning studs, and the plurality of positioning studs are arranged in a straight line.

As an example, the at least one positioning mechanism comprises at least two positioning mechanisms, and the at least two positioning mechanisms are disposed respectively on two opposite non-light-incident sides of the back plate.

Another embodiment of the present disclosure provides a display device, comprising the afore-mentioned backlight module.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present disclosure, are not intended to indicate any sequence, amount or importance, but distinguish various components. The terms "comprises," "comprising," "includes," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

Figure 1:
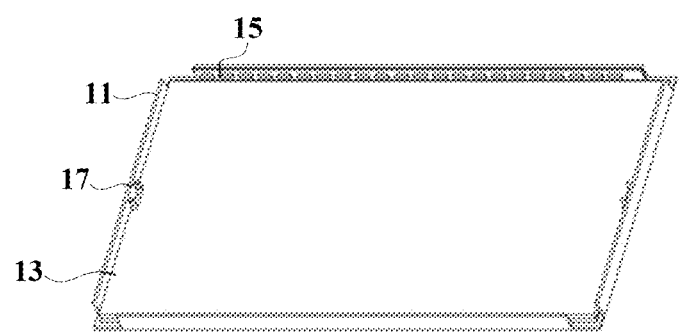
FIG. 1 schematically illustrates a backlight module.
Figure 2:
FIG. 2 schematically illustrates a cross-section view of the backlight module.

As illustrated in FIGS. 1 and 2, a edge-lit type backlight module comprises a back plate 11, which comprises a bottom plate and side walls enclosed to form a receiving space; the edge-lit type backlight module further comprises a reflector 12, a light guide plate 13 and an optical film 14 disposed successively in the receiving space of the back plate 11. The edge-lit type backlight module further comprises: a light source 15 disposed between the side walls of the back plate 11 and a light incident surface of the light guide plate 13, and a frame 16 disposed on a front side of the optical film 14 and coupled with the back plate 11. Positioning studs 17 are disposed inside the bottom plate of the back plate 11, and positioning protrusions 18 are disposed inside a front wall of the frame 16. The light guide plate 13 comprises grooves matched with the positioning studs 17, and the optical film 14 comprises first notches matched with the positioning studs 17 of the back plate 11 and second notches matched with the positioning protrusions 18 of the frame 16.

Embodiments of the present disclosure provide a backlight module and a display device, which can reduce the generation of the scraps of the light guide plate, and avoid the deviation of the light guide plate and the optical film.

Figure 3:
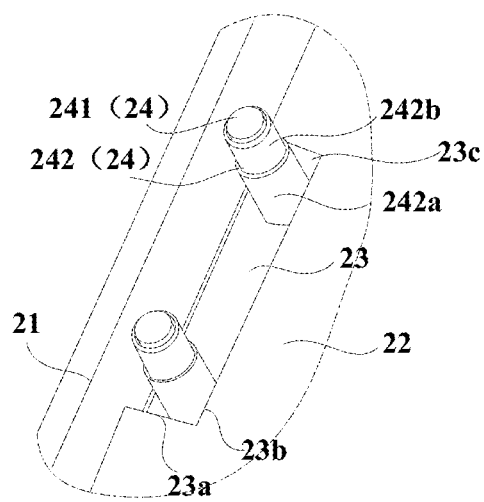
FIG. 3 schematically illustrates a positioning mechanism according to an embodiment of the present disclosure.
Figure 4:
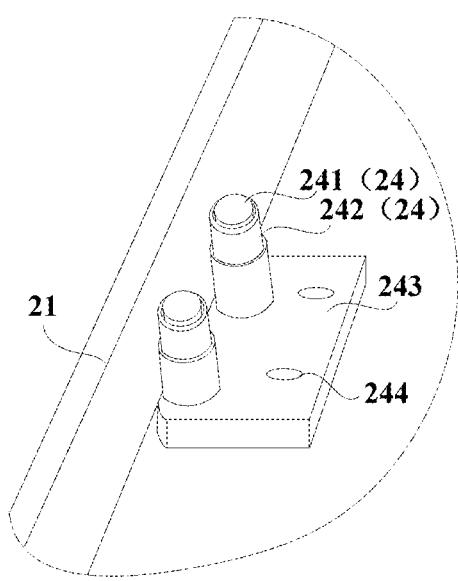
FIG. 4 schematically illustrates another positioning mechanism according to an embodiment of the present disclosure.

As illustrated in FIGS. 3 and 4, there is provided a backlight module according to an embodiment of the present disclosure, the backlight module comprises: a back plate 21 and a light guide plate 22; at least one positioning mechanism 24 is disposed inside a bottom plate of the back plate 21, each positioning mechanism 24 comprises at least one positioning stud, each positioning stud comprises a main body 241 and a flexible sleeve 242 wrapping the main body 241. The light guide plate 22 comprises a groove 23 matched with the positioning mechanism 24, an inner wall (i.e., a sidewall) of the groove 23 is in contact with the flexible sleeve 242 of the main body 241. The groove 23 is, for example, a through-via which passes through the light guide plate 22, for allowing the positioning mechanism 24 to pass through the groove 23. When the distance between the two positioning mechanisms 24 is relatively larger, a groove 23 is provided for each positioning mechanism 24; when the distance between the two positioning mechanisms 24 is relatively smaller, a sharing groove 23 is provided for the two positioning mechanisms 24, as illustrated in FIG. 3. It can be understood that, the position of the groove 23 depends on the position of the positioning mechanism 24, it may be disposed on the outer peripheral edge of the light guide plate (as illustrated in FIG. 3), and also may be disposed at the four corners of the light guide plate or other positions.

In the present embodiment, the groove 23 comprises three side walls 23a, 23b and 23c, and at least one side wall, such as the side wall 23c, is in contact with the flexible sleeve 242. In other embodiments, at least two side walls, such as the side walls 23a, 23b, are in contact with the flexible sleeve 242, or each side wall is in contact with the flexible sleeve 242.

According to the above embodiments of the present disclosure, the light guide plate 22 of the backlight module is in elastic contact with the flexible sleeve 242, which can prevent the scraps from being generated due to the hard contact between the light guide plate and the positioning parts, thus the display effect is increased. In addition, the positioning mechanism 24 of the backlight module is used for positioning the light guide plate 22 and the optical film 25 simultaneously, compared with using different positioning parts for positioning the light guide plate and the optical film 25 respectively, the number of the positioning mechanisms 24 is reduced, the accumulated tolerance of a plurality of positioning mechanisms 24 is reduced, and the deviation of the light guide plate and the optical film is avoided.

Figure 5:
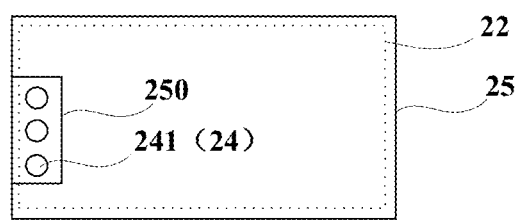
FIG. 5 schematically illustrates a top view of a light guide plate and an optical film according to an embodiment of the present disclosure.

In at least some of the embodiments, the backlight module further comprises an optical film, the optical film is provided with a notch matched with the positioning mechanism 24, and the position of the notch may be designed with reference to the position and the number of the grooves on the light guide plate. As illustrated in FIG. 5, the optical film 25 is provided with a notch 250, the optical film may be attached to an upper surface of the light guide plate 22 illustrated in FIG. 3, such that the position of the notch 250 corresponds to the position of the groove disposed on the light guide plate 22. In this way, the positioning mechanism 24 exposed by the upper surface of the light guide plate 22 pass through the optical film 25. As an example, the flexible sleeve of the main body is in contact with an inner wall (i.e., a sidewall) of the notch 250 of the optical film 25, thus an elastic contact between the optical film 25 and the flexible sleeve 242 is achieved, and then a hard contact between the optical film and the positioning parts is avoided.

In at least some of the embodiments, the main body 241 has a columnar shape. The main body 241 has the same shape and the same size at any section in a plane parallel to the bottom plate of the backplane 21. For example, the shape of the section of the main body 241 in a plane parallel to the bottom plate of the back plate 21 includes regular geometric shapes, such as oval, circular, regular polygons (squares or rectangles). Therefore, the columnar shape includes oval cylinder, cylinder and prism (such as triangular prism, a quadrangular prism), etc. In other embodiments, the shape of the section of the main body 241 in a plane parallel to the bottom plate of the back plate 21 includes irregular geometric shape.

In at least some of the embodiments, the main body has a tapered shape, and it is tapered in a direction from the light guide plate to the optical film. For example, the tapered shape includes circular cone, oval cone, or a pyramid (such as a triangular pyramid, a rectangular pyramid) etc. As an example, the main body has a tapered shape and a flat head, so as to avoid collision or scratch with the equipment disposed on the top of it.

In at least some of the embodiments, the main body has a stepped columnar shape, which comprises a first portion proximal to the light guide plate and a second portion proximal to the optical film; an orthographic projection of the first portion is greater than that of the second portion in a plane parallel to the bottom plate of the back plate. For example, in the present embodiment, the main body 241 is in a shape of a stepped cylinder, which comprises a thicker cylindrical portion proximal to the light guide plate 22 and a thinner cylindrical portion proximal to the optical film 25, that is, a diameter of the first portion is greater than that of the second portion. In addition, the optical film 25 of the backlight module may be extended beyond the edge of the groove 23 of the light guide plate 22, which can effectively reduce the light leakage of the backlight module at the groove 23 of the light guide plate 22.

As illustrated in FIG. 3, the flexible sleeve 242 has a stepped tube shape, which comprises a first portion 242a proximal to the light guide plate 22 and a second portion 242b proximal to the optical film (not shown); a thickness of the first portion 242a is greater than a thickness of the second portion 242b in a direction perpendicular to the bottom plate of the back plate. According to the present embodiments, the optical film is extended beyond the edge of the groove 23 of the light guide plate 22, which can effectively reduce the light leakage of the backlight module at the groove 23 of the light guide plate 22.

As illustrated in FIG. 4, according to the present embodiments, each positioning mechanism 24 of the backlight module further comprises a flexible gasket 243; the flexible gasket 243 is connected with the bottom plate of the back plate 21.

In at least some of the embodiments, the flexible sleeve 242 of at least one positioning stud is integral with the flexible gasket 243. The flexible gasket 243 can increase the frictional force between the light guide plate 22 and the back plate 21, therefore, the deviation of the light guide plate 22 relative to the back plate 21 can be reduced, and the impact force of the light guide plate 22 on the main body 241 can be reduced.

The connection manner between the flexible gasket 243 and the bottom plate of the back plate 21 is not limited, for example, the flexible gasket 243 and the bottom plate of the back plate 21 may be adhered or bolted together. As illustrated in FIG. 4, in the present embodiment, the bottom plate of the back plate 21 comprises protrusions (not shown); holes 244 matched with the protrusions are provided on the flexible gasket 243, so it is easy for the assembly or disassembly of the flexible gasket 243. In another embodiment of the present disclosure, the bottom plate of the back plate 21 comprises grooves, and protrusions matched with the grooves are provided on the flexible gasket 243.

The materials of the flexible sleeve 242 and the flexible gasket 243 are not limited, for example, the flexible sleeve 242 is a rubber sleeve, and the flexible gasket 243 is a rubber gasket. The positioning stud may be made from a rigid material, such as metal or alloy.

In at least some of the embodiments, at least one positioning mechanism comprises a plurality of positioning studs, and the plurality of positioning studs are arranged in a straight line. For example, the plurality of positioning studs are spaced apart from each other with equal internals (as illustrated in FIG. 5). In the present embodiment, each positioning mechanism 24 comprises two positioning studs, therefore, it is more convenience for the processing of fabricating the groove 23 of the light guide plate 22 and the notch 250 of the optical film 25, in comparison with the case that each positioning mechanism 24 comprises one positioning stud, and the production cost is saved in comparison with the case that each positioning mechanism 24 comprises a plurality of positioning studs.

The number of the positioning mechanisms 24 is not limited, for example, there are at least two positioning mechanisms 24, and they are disposed respectively on two opposite non-light-incident sides of the back plate 21 (for example, as illustrated in FIG. 1), and then the positioning accuracy is further increased.

There is further provided a display device according to an embodiment of the present disclosure, which comprises the backlight module provided in any one of the above embodiments.

For the display device provided in the present embodiment, the light guide plate 22 is in an elastic contact with the flexible sleeve 242 of the positioning mechanism 24, which can prevent the scraps from being generated due to the hard contact between the light guide plate 22 and the positioning parts, thereby the generation of the scraps is reduced, and the display effect is increased. In addition, the positioning mechanism 24 of the backlight module of the display device is used for positioning the light guide plate 22 and the optical groove simultaneously, thus the number of the positioning mechanisms 24 is reduced, and the accumulated tolerance of a plurality of positioning mechanisms 24 is reduced.

The type of the display device is not limited, for example, it may be a liquid crystal television, a liquid crystal display, a digital photo frame, an electronic paper, and a mobile phone, etc.

What are described above is related to the illustrative embodiments of the disclosure only and not limitative to the scope of the disclosure; the scopes of the disclosure are defined by the accompanying claims.

The invention claimed is:

1. A backlight module, comprising:
   a back plate,
   at least one positioning mechanism, provided inside a bottom plate of the back plate, each positioning mechanism comprising at least one positioning stud and a flexible gasket, the flexible gasket being connected with the bottom plate of the back plate, and each positioning stud comprising a main body and a flexible sleeve wrapping the main body; and
   a light guide plate provided with a first groove, the first groove being matched with the at least one positioning mechanism, and an inner wall of the first groove being in contact with the flexible sleeve.

2. The backlight module according to claim 1, further comprising: an optical film, wherein the optical film is provided with a notch matched with the at least one positioning mechanism.

3. The backlight module according to claim 1, wherein a shape of a cross-section of the main body in a plane parallel to the bottom plate is in regular geometric shape.

4. The backlight module according to claim 1, wherein the flexible sleeve of the at least one positioning stud and the flexible gasket are integral structure.

5. The backlight module according to claim 1, wherein the bottom plate of the back plate comprises a protrusion, and the flexible gasket comprises a hole matched with the protrusion.

6. The backlight module according to claim 1, wherein the bottom plate of the back plate comprises a second groove, and the flexible gasket comprises a protrusion matched with the second groove.

7. The backlight module according to claim 1, wherein the flexible sleeve is a rubber sleeve, and the flexible gasket is a rubber gasket.

8. The backlight module according to claim 1, wherein the at least one positioning mechanism comprises a plurality of positioning studs, and the plurality of positioning studs are arranged in a straight line.

9. The backlight module according to claim 1, wherein the at least one positioning mechanism comprises at least two positioning mechanisms, and the at least two positioning mechanisms are disposed respectively on two opposite non-light-incident sides of the back plate.

10. A display device, comprising: the backlight module according to claim 1.

11. The backlight module according to claim 2, wherein the main body is in columnar shape, and the main body has same shape and same size at any cross-section in a plane parallel to the bottom plate of the backplane.

12. The backlight module according to claim 2, wherein the main body is in stepped columnar shape, and comprises a first portion proximal to the light guide plate and a second portion proximal to the optical film; wherein an orthographic projection of the first portion is greater than an orthographic projection of the second portion in a plane parallel to the bottom plate of the back plate.

13. The backlight module according to claim 2, wherein the main body is in tapered shape, and the main body is tapered in a direction from the light guide plate to the optical film.

14. The backlight module according to claim 2, wherein the main body is in tapered shape and has a flat head.

15. The backlight module according to claim 3, wherein the regular geometric shape is one of oval, circle and regular polygon.

16. The backlight module according to claim 11, wherein the flexible sleeve is in stepped tube shape, and comprises a first portion proximal to the light guide plate and a second portion proximal to the optical film; a thickness of the first portion is greater than a thickness of the second portion in a direction perpendicular to the bottom plate.

\* \* \* \* \*